Sept. 2, 1941. C. E. FRUDDEN 2,254,361
VEHICLE WHEEL
Original Filed May 17, 1939

Inventor
C. E. Frudden
by
Attorney

Patented Sept. 2, 1941

2,254,361

UNITED STATES PATENT OFFICE 2,254,361

VEHICLE WHEEL

Conrad E. Frudden, Wauwatosa, Wis., assignor to Allis-Chalmers Manufacturing Company, Milwaukee, Wis., a corporation of Delaware Original application May 17, 1939, Serial No. 274,164. Divided and this application September 7, 1940, Serial No. 355,736

2 Claims. (Cl. 301—18)

The invention relates to vehicle wheels, and it is concerned more specifically with the mounting of a tire rim on a wheel body. The present application is a division of application Serial No. 274,164, filed on May 17, 1939, by Conrad E. Frudden and Walter F. Strehlow, for Tractor.

It is an object of the invention to provide an improved detachable rim mounting of the type in which the rim is engaged at circumferentially spaced portions by gripping elements on the wheel body, and in which the relative spacing of the gripping elements may be varied in order to tighten the rim by increasing the relative spacing of the gripping elements, and in order to loosen the rim by decreasing the relative spacing of the gripping elements.

More specifically it is an object of the invention to provide an improved connection between the wheel body and the rim, including a gripping element which may be adjusted transversely of the axis of the wheel body in order to tighten or loosen the rim, the improved connection being of utmost simplicity and permitting arrangement of the gripping element selectively at one side or the other of the wheel body.

Another object of the invention is to provide an improved connection of the mentioned character in which relatively few and inexpensive parts are employed to retain the rim on the wheel body and permit its adjustment from one position, axially of the wheel body, to another, the latter adjustment being particularly desirable in tractor wheels where it may be used to change the tread spacing of the wheels.

Another object of the invention is to provide a rim mounting of the mentioned character employing relatively few and inexpensive parts which cooperate efficiently with the wheel body and the rim to hold the rim securely in position on the wheel body; which parts are suitable for severe service, as in tractor use; and which parts will not readily get out of order so that it would be difficult or impossible to operate them for tightening and loosening the rim.

These and other objects and advantages of the invention will be apparent from the following description of a preferred embodiment of the invention.

Referring to the drawing accompanying and forming part of this specification, and in which like reference characters designate the same or similar parts in the various views.

Figure 1:
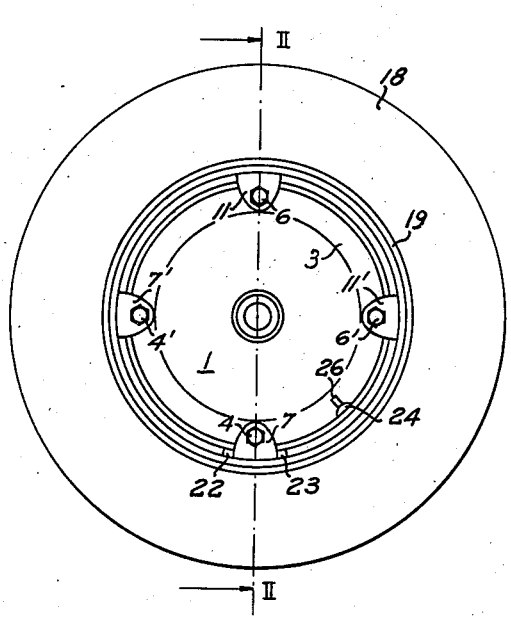
Fig. 1 is a side view of a vehicle wheel having a detachable rim.
Figure 2:
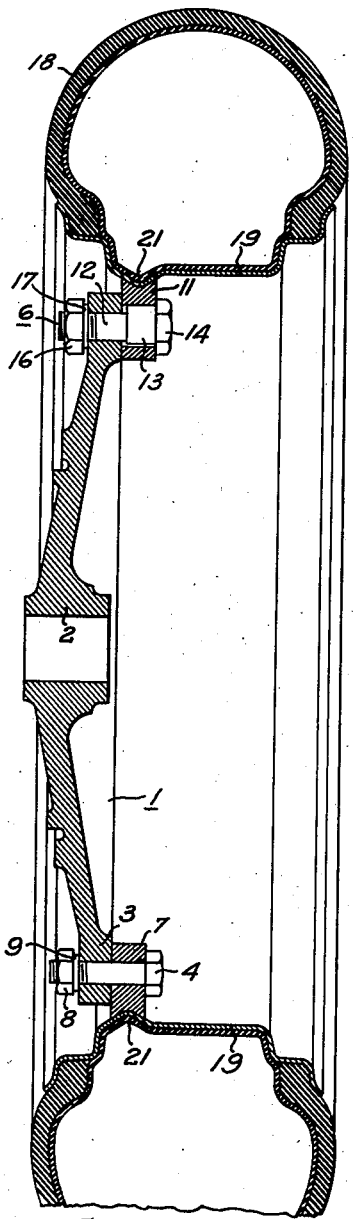
Fig. 2 is an enlarged sectional view on line II—II of Fig. 1.
Figure 3:
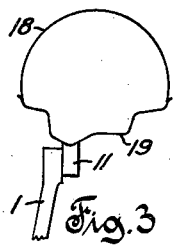

Figs. 3 to 6, inclusive, are schematic views showing different arrangements of the rim shown in Figs. 1 and 2 relative to the wheel body.

The wheel shown in Figs. 1 and 2 comprises a disk type wheel body 1 which has a central hub portion 2 for connection with an axle (not shown), and a peripheral radially extending flange portion 3 having plane side surfaces extending parallel to each other at opposite sides of the wheel body. The flange portion 3 has four circumferentially spaced transverse bores, for the reception of plain shank bolts 4 and 4' and cam bolts 6 and 6', the transverse bores of the flange 3 being all of the same size and equally spaced from each other circumferentially of the wheel body. The plain shank bolts 4 and 4' and the cam bolts 6 and 6' are insertable into the transverse bores of the flange 3 selectively from opposite sides of the wheel body, and they are shown in Figs. 1 and 2 as being inserted from the inner or vehicle side of the wheel body.

Interposed between the head of the plain shank bolt 4 and the inner side surface of the flange 3 of the wheel body is a gripping element or clamping lug 7, and a clamping lug 7' which is an exact duplicate of the clamping lug 7 is interposed between the head of the plain shank bolt 4' and the inner side surface of the flange 3 of the wheel body. The clamping lugs 7 and 7' are drawn up against the inner side of the wheel body by nuts on the bolts 4 and 4', which bear against the outer side surface of the flange 3 of the wheel body, the nut for the bolt 4 being shown in Fig. 2 and indicated by the reference character 8, and a lock washer 9 being interposed between the nut 8 and the flange 3 of the wheel body. A similar lock washer (not shown) is interposed between the nut on bolt 4' and the outer surface of the flange 3.

Figure 7:
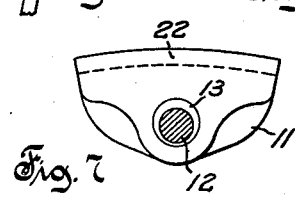
Fig. 7 is a detail view of a rim clamp shown in Figs. 1 and 2.

Another gripping element or clamping lug 11 is interposed between the head of the cam bolt 6 and the inner side surface of the flange 3, and a clamping lug 11' which is an exact duplicate of the clamping lug 11 is interposed between the head of the cam bolt 6' and the inner side surface of the flange 3. As best shown in Fig. 2 the cam bolt 6 has a shank portion 12 which extends through the respective transverse bore of the flange 3, and a radial cam portion 13 (also shown in Fig. 7) in eccentric relation to the shank portion 12 extends axially of the cam bolt 6 between its head 14 and the shank portion 12. The cam portion 13 is engaged with a transverse bore of the clamping lug 11, and the clamping lug 11 is drawn up against the inner side of the flange 3 by a nut 16 on the threaded end of the shank portion 12, a lock washer 17 being interposed between the nut 16 and the outer side of the flange 3. The length of the cam portion 13, axially of the cam bolt 6, is somewhat shorter than the thickness of the clamping lug 11, as shown in Fig. 2, so that the clamping lug 11 may be drawn firmly against the flange 3 by tightening of the nut 16. The clamping lug 11' is secured to the inner side of the flange 3 by means of the cam bolt 6' which is an exact duplicate of the cam bolt 6, the cam bolt 6' having a nut (not shown) on the threaded end of its shank portion, corresponding to the nut 16, and a lock washer (not shown) corresponding to the lock washer 17 being interposed between the outer side of the flange 3 and the nut on the cam bolt 6' to secure the nut on the cam bolt 6' after it is tightened to draw the clamping lug 11' against the inner side of the flange 3 of the wheel body. The nuts and lock washers on the plain shank bolts 4 and 4' are interchangeable with the nuts and lock washers on the cam bolts 6 and 6'.

A pneumatic tire 18 is mounted in an ordinary manner on a tire rim 19 which has an annular inwardly projecting ridge portion 21 of V-shaped cross-section, as shown in Fig. 2. The ridge portion 21 of the rim is seated in a V-shaped groove 22 formed in the circumferential or outer portion of the clamping lug 11, and the lug 7 which is diametrically opposed to the lug 11 has a similar V-shaped groove in its outer or circumferential portion in engagement with the ridge 21 of the rim 19. The ridge portion 21 of the rim 19 is also engaged at diametrically opposed points by the clamping lugs 7' and 11', these lugs being duplicates, as stated, of the lugs 7 and 11, respectively, and having V-shaped circumferential grooves for the reception of the ridge portion of the rim 19.

A pair of peripherally spaced lugs 22 and 23 are secured to the rim 19, preferably by welding, the peripheral spacing of these lugs being such that one of the clamping lugs, in the present instance the clamping lug 7, may be received therebetween as shown in Fig. 1. The lugs 22 and 23 cooperate with the clamping lug 7 to prevent rotary displacement of the rim 19 relative to the wheel body 1 when the wheel body is rotated under propelling power applied thereto. A cutout 24 in the wheel body 1 for the reception of a tire valve 26 is spaced 45 degrees from the centers of the adjacent bolts 4 and 6'.

In order to remove the tire rim 19 from the wheel body 1 the nuts on the cam bolts 6 and 6' are loosened and the bolts may then be turned to move the clamping lugs 11 and 11' transversely of the axis of the wheel body 1 away from the ridge portion 21 of the rim. The cam bolts 6 and 6' may then be readily withdrawn from the wheel body 1, and the wheel rim may be removed from the wheel body. On the other hand, when the rim 19 is to be mounted on the wheel body 1 the clamping lugs 7 and 7' are first mounted on the wheel body by means of the plain shank bolts 4 and 4', and the wheel rim is arranged in a position so as to place the ridge portion 21 of the rim into the V-shaped peripheral grooves of the clamping lugs 7 and 7'. The cam bolts 6 and 6', with the clamping lugs 11 and 11' positioned on the eccentric cam portions thereof, are then inserted through the respective transverse holes in the flange 3 of the wheel body 1 and turned by means of a wrench fitting the heads of the cam bolts 6 and 6', to move the clamping lugs 11 and 11' transversely of the axis of the wheel body in an outward direction, which movement, although only of small magnitude, will cause the rim to be tightly gripped by the clamping lugs 11 and 11', the clamping lugs 7 and 7' affording proper abutments against which the rim 19 is drawn up by said outward movement of the clamping lugs 11 and 11'. After the clamping lugs 11 and 11' have been tightened by movement transversely of the axis of wheel body 1, the nuts on the cam bolts 6 and 6' are drawn up to secure the parts in permanently fixed position relative to each other. Each of the cam bolts 6 and 6', together with the respective clamping lugs 11 and 11', constitutes a toggle mechanism between the wheel body 1 and the rim 19, and these toggle mechanisms are in dead center position or approximately so when the cam bolts 6 and 6' have been turned to force the clamping lugs 11 and 11' firmly into engagement with the ridge portion 21 of the rim 19. The toggles, after being moved into or approximately into their dead center positions are not easily broken because the clamping lugs 11 and 11' engage the rim on surfaces of substantial lengths peripherally of the rim, and the joints of the toggle mechanisms afford enough friction to hold the toggle mechanisms in dead center position or approximately so even while the nuts on the cam bolts 6 and 6' are loose. It is therefore not necessary to hold the cam bolts 6 and 6' with a wrench against rotation after they have been turned to force the clamping lugs 11 and 11' into engagement with the ridge portion 21, and this feature facilitates assembly of the wheel body and rim.

Figure 4:
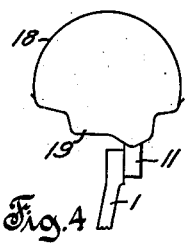
Figure 5:
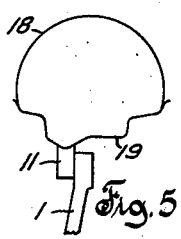
Figure 6:
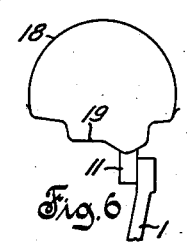

It will be noted that each of the clamping lugs has a peripheral portion for engagement with the rim and a radial portion which may be overlappingly engaged with the flange 3 selectively at one side or the other of the wheel body. Referring to Figs. 3 to 6, inclusive, the relative position of the rim 19 and the wheel body 1 illustrated in Fig. 3 corresponds to that shown in Fig. 2. By reversing the position of the rim on the clamping lugs 7, 7' and 11, 11' the position of the tire relative to the wheel body, as shown in Fig. 4, may be obtained. Fig. 5 shows the clamping lug 11 moved from the inner side of the wheel body 1 to the outer side, and in this type of mounting all of the clamping lugs are, of course, secured to the outer side of the wheel body 1. In order to position the clamping lugs on the outer side of the wheel body the plain shank bolts 4, 4' and the cam bolts 6, 6', are inserted into their respective holes in the flange 3 from the outer side of the wheel body, and the nuts and lock washers on these bolts are positioned on the inner side of the wheel body. In Fig. 5 the rim 19 is positioned to extend, with its larger portion, inwardly over the wheel body 1 whereas in Fig. 6 the rim is reversed relative to the position in which it is shown in Fig. 5, the clamping lugs in Fig. 6 being positioned on the outer side of the wheel body 1 the same as in Fig. 5. The various positions of the rim and tire relative to the wheel body indicated in Figs. 3 to 6 may be used to change the tread spacing of the wheels on a tractor as is more fully disclosed in the mentioned parent application, Serial No. 274,164

While in the foregoing a preferred embodiment of the invention has been shown and described, it should be understood that it is not intended to limit the invention to the exact details of construction herein shown and described, for various modifications within the scope of the claims may occur to persons skilled in the art.

It is claimed and desired to secure by Letters Patent:

1. In a vehicle wheel, a wheel body, a rim, and connecting means between said wheel body and rim permitting adjustment of said rim from one position, axially of said wheel body, to another; said connecting means including a clamping lug having a circumferential portion engageable with said rim, and a radial portion overlappingly engageable with said wheel body optionally at one side or the other of the latter, and a bolt and nut for securing said radial portion of said clamping lug to said wheel body at either side of the latter, said bolt having a shank portion insertable into a transverse bore of said wheel body from either side of the latter and a radial cam portion, in eccentric relation to said shank portion, engageable with a transverse bore of said clamping lug, whereby said bolt, having said cam portion thereof engaged by said clamping lug and having said shank portion thereof extending through said transverse bore of said wheel body, may be rotated to move said clamping lug towards and away from said rim.

2. In a vehicle wheel, a wheel body, a rim, a plurality of clamping lugs each having a circumferential portion engageable with said rim and a radial portion overlappingly engageable with said wheel body optionally at one side or the other of the latter, and means for securing said radial portions of said clamping lugs to said wheel body at either side of the latter, said means comprising a set of straight shank bolts extending, respectively, through certain of said clamping lugs and being selectively insertable into circumferentially spaced transverse bores of said wheel body from either side of the latter, nuts on said straight shank bolts for drawing said clamping lugs secured thereby laterally against said wheel body, a set of cam bolts having shank portions, respectively, insertable into circumferentially spaced transverse bores of said wheel body from either side of the latter, and radial cam portions in eccentric relation to said shank portions, said cam portions being engageable, respectively, with transverse bores of certain others of said clamping lugs, and nuts on said cam bolts for drawing said other clamping lugs secured thereby laterally against said wheel body, the cam portions of said cam bolts cooperating respectively with said other clamping lugs to move the latter outwardly into gripping engagement with said rim and inwardly out of gripping engagement with said rim by rotation of said cam bolts.

CONRAD E. FRUDDEN.